US005671063A

United States Patent [19]
Auberry et al.

[11] Patent Number: 5,671,063
[45] Date of Patent: Sep. 23, 1997

[54] ERROR TOLERANT METHOD AND SYSTEM FOR MEASURING FEATURES OF ENGRAVED AREAS

[75] Inventors: Eric R. Auberry, Beavercreek; David L. Flannery, Englewood; Kenneth William Jackson, Dayton; David R. Seitz, Vandalia; Eric J. Serenius, Springboro, all of Ohio

[73] Assignee: Ohio Electronic Engravers, Inc., Dayton, Ohio

[21] Appl. No.: 431,710

[22] Filed: Apr. 27, 1995

Related U.S. Application Data

[63] Continuation-in-part of Ser. No. 415,638, Apr. 3, 1995, which is a continuation-in-part of Ser. No. 125,938, Sep. 23, 1993, Pat. No. 5,440,398, which is a continuation-in-part of Ser. No. 22,127, Feb. 25, 1993, Pat. No. 5,424,845.

[51] Int. Cl.$^6$ ............................................. B41C 1/02
[52] U.S. Cl. .................................................. 358/299
[58] Field of Search ..................... 358/299; 356/378, 356/379; 364/474.35, 474.37

[56] References Cited

U.S. PATENT DOCUMENTS

| 2,493,628 | 1/1950 | Harley | 88/14 |
| 2,777,058 | 1/1957 | Boyajean | 250/27 |
| 2,874,479 | 2/1959 | Farber | 33/185 |
| 2,943,564 | 7/1960 | Demer | 101/93 |
| 3,280,252 | 10/1966 | Lilien et al. | 358/450 |

(List continued on next page.)

OTHER PUBLICATIONS

The Gravure Association of America, *The Gravure Engraving Manual* (1987).
Balcom, *Basic Rotogravure* (1988).
Heimann GmbH, *Drucktechnische Beratung–Graphischer Handel* (Pamphlet, Hamm, Germany, 1984).
Heimann GmbH, *Check–Master* (Pamphlet, Date Unknown).
Ahauser Tiefdruck–Gravuren GmbH & Co., *Engraving Tester ET 2000* (Pamphlet, Date Unknown).
Promotes Graphique, *M2B2 modele depose MICRO Surface Sarl* (Pamphlet, Antony, France, 1987).
*VIP—Video–Image Processing* (Pamphlet, Author & Date Unknown).

(List continued on next page.)

*Primary Examiner*—Eric Frahm
*Attorney, Agent, or Firm*—Jacox, Meckstroth & Jenkins

[57] ABSTRACT

An engraving system for engraving printing cells in a gravure printing cylinder uses a video camera for feedback control of printing cell width. A setup procedure for the engraving system involves engraving an isolated test cell and a series of adjacent test cells, the latter being engraved under steady state engraving conditions. The isolated test cell is located through a search sequence which establishes a strobe control count for a strobe trigger unit. The strobe control count then is adjusted for steady state engraving by acquiring and centering a steady state test cell. Cell width is measured by creating video runtable sets for a plurality of overlapping video boxes and finding a maximum connected run length which meets predetermined acceptance criteria.

34 Claims, 9 Drawing Sheets

U.S. PATENT DOCUMENTS

| | | | |
|---|---|---|---|
| 3,612,753 | 10/1971 | Korman | 178/5.2 A |
| 3,652,992 | 3/1972 | Koll | 340/146.3 B |
| 3,769,455 | 10/1973 | de Vos et al. | 178/6.6 B |
| 3,770,888 | 11/1973 | de Vos et al. | 178/6.6 B |
| 3,784,739 | 1/1974 | de Vos et al. | 358/477 |
| 3,876,829 | 4/1975 | Schreiber | 178/7.3 D |
| 3,904,816 | 9/1975 | Taudt et al. | 178/6 |
| 3,918,348 | 11/1975 | Runft | 90/11 R |
| 3,931,570 | 1/1976 | George et al. | 324/34 R |
| 3,956,583 | 5/1976 | Pugsley | 178/6.6 R |
| 4,001,495 | 1/1977 | Tauszig | 358/294 |
| 4,003,311 | 1/1977 | Bardia | 101/426 |
| 4,007,362 | 2/1977 | Sindermann | 358/487 |
| 4,012,584 | 3/1977 | Gascoigne | 358/302 |
| 4,052,739 | 10/1977 | Wada et al. | 358/299 |
| 4,072,928 | 2/1978 | Wilder | 340/146.3 H |
| 4,075,662 | 2/1978 | Gall | 358/280 |
| 4,079,235 | 3/1978 | Froyd et al. | 364/107 |
| 4,126,821 | 11/1978 | Cannon | 318/696 |
| 4,240,118 | 12/1980 | Wellendorf et al. | 358/296 |
| 4,315,285 | 2/1982 | Sommer et al. | 358/280 |
| 4,342,050 | 7/1982 | Traino | 358/256 |
| 4,342,052 | 7/1982 | Rackley et al. | 358/450 |
| 4,347,785 | 9/1982 | Chase et al. | 101/401.1 |
| 4,357,633 | 11/1982 | Buechler | 358/299 |
| 4,363,037 | 12/1982 | Taudt | 358/296 |
| 4,394,693 | 7/1983 | Shirley | 358/298 |
| 4,437,122 | 3/1984 | Walsh et al. | 358/166 |
| 4,450,486 | 5/1984 | Buechler | 358/299 |
| 4,451,856 | 5/1984 | Buechler | 358/299 |
| 4,503,468 | 3/1985 | Serinken et al. | 358/256 |
| 4,603,391 | 7/1986 | Inoue et al. | 364/474 |
| 4,612,584 | 9/1986 | George et al. | 358/299 |
| 4,678,976 | 7/1987 | Inoue | 318/577 |
| 4,683,499 | 7/1987 | Kuwabara | 358/264 |
| 4,683,500 | 7/1987 | Kitamura et al. | 358/280 |
| 4,691,229 | 9/1987 | Colditz et al. | 358/76 |
| 4,691,238 | 9/1987 | Yamada | 358/280 |
| 4,700,235 | 10/1987 | Gall | 358/283 |
| 4,944,593 | 7/1990 | Kalstroem et al. | 356/379 |
| 4,972,323 | 11/1990 | Cauwet | 364/474.29 |
| 5,029,011 | 7/1991 | Fraser | 358/299 |
| 5,229,861 | 7/1993 | Nozaka et al. | 358/299 |
| 5,293,426 | 3/1994 | Wouch et al. | 382/1 |
| 5,329,215 | 7/1994 | Fraser et al. | 318/569 |
| 5,438,422 | 8/1995 | Holowko et al. | 358/299 |
| 5,440,398 | 8/1995 | Holowko | 358/299 |

OTHER PUBLICATIONS

"Numerical Analysis: A Practical Approach", Melvin J. Maron, p. 188 (no date).

"The Image Processing Handbook", John C. Russ pp. 105–113, (1992).

"Numerical Recipes in C The Art of Scientific Computing", William H. Press, Brian P. Flannen, Saul A. Teukolsky & William T. Vetterling, pp. 452–460, (1988).

"Datwyler", Max Daetwyler Corporation, 13420 West Reese Blvd., Huntersville, NC 28078, undated brochure.

"Twin–Pilot", Maschinefabrik Kaspar Walter GmbH & Co. KG, Plinganserstrasse 22, 8000 Munchen 70, Germany, undated brochure.

"Polishmaster Junior High–Precision Machining & Measuring Center for Rotograyure Cylinders," MDC Max Datwyler AG, CH–3368 Bleinenbach/Schweiz, Switzerland, undated brochure.

"Finishmaster Unit for Polishing of Rotogravure Cylinders After Copper or Chrome Plating," MDC Max Datwyler AG, CH–3368 Bleienbach/Schweiz, Switzerland, undated brochure.

"Cu–Master Type E Plating Tanks for Copper–Plating fo Rotogravure Cylinders," MDC Max Datwyler AG, CH–3368 Bleienbach/Schweiz, Switzerland, undated brochure.

"Cr–Master Type E Plating Tanks for the Chrome–Plating of Rotogravure Cylinders," MDC Max Datwyler AG, CH–3368 Bleienbach/Schweiz, Switzerland, undated brochure.

Jav, "Getting Better Accuracy With Non–Precision Ball Screws," American Machinist, Feb. 1993, pp. 50–51.

*The Image Processing Handbook*, by John C. Russ, CRC Press Boca Raton, FL, 1992, pp. 267–269, 286–287.

*Pattern Recognition Engineering* by Morton Nadler & Eric P. Smith, John Wiley & Sons Inc., New York, NY, 1993, pp. 109–111, 556, 558.

ERROR TOLERANT METHOD AND SYSTEM FOR MEASURING FEATURES OF ENGRAVED AREAS

CROSS REFERENCES TO RELATED APPLICATIONS

This application is a continuation-in-part of copending U.S. application Ser. No. 08/415,638 filed Apr. 3, 1995 which is a continuation-in-part of Ser. No. 08/125,938 filed Sep. 23, 1993, now U.S. Pat. 5,440,398, which is a continuation-in-part of U.S. application Ser. No. 08/022,127 filed Feb. 25, 1993, now U.S. Pat. No. 5,424,845, all of which are assigned to the same assignee and are incorporated herein by made and made a part hereof.

BACKGROUND OF THE INVENTION

This invention relates to the field of engraving and more particularly to engraving of gravure printing surfaces, such as gravure printing cylinders. Even more particularly this invention relates to diamond stylus engravers which use video cameras for feedback control of a cell dimension, as disclosed in copending application Ser. No. 08/125,938, now U.S. Pat. No. 5,440,398.

In closed loop engraving of the type disclosed in Ser. No. 08/125,938, now U.S. Pat. No. 5,440,398 it is necessary for the video system to generate high resolution images of previously engraved cells for accurate measurement thereof. High resolution imaging may imply a relatively high degree of optical magnification and a correspondingly narrow range of focus. Unfortunately the curvature of a gravure printing cylinder inhibits a sharp focus except within a relatively narrow strip extending in the axial direction along the surface of the cylinder.

Before a cell can be measured, it must be identified and positioned inside the sharply focussed portion of the video image. When the magnification and focus are adjusted for the required measurement accuracy, the optical field of view becomes quite small. This makes it difficult to find a cell which is to be measured.

The problem is further complicated by the rotation of the printing cylinder which proceeds in synchronism with oscillating radial motion of the engraving stylus. The video camera must be strobed at the correct phase to place the relevant cell within the confines of the narrow focussed strip. This phase is established during a setup procedure involving the engraving of a pattern of test cells. However, until a predetermined cell has been placed within the finely focussed strip, it is difficult to know how the phase should be adjusted. As a consequence, correct strobing phase adjustment can become a trial and error process.

Another problem with such closed loop engraving occurs when optically visible defects appear in the image of a cell being examined. Such defects may manifest themselves in the form of cell wall breaks or images of non-existent islands within a region of observation. These defects can lead to incorrect measurements, thereby causing the controller to make erroneous adjustments in the engraving setup.

SUMMARY OF THE INVENTION

This invention provides closed loop engraving having improved video tracking capability. The improvement resides in a single cell acquisition technique and in a cell measurement technique which analyzes video run length data within a plurality of differently defined boxes.

As practiced in this invention, single cell acquisition begins by positioning a video camera adjacent the printing surface and adjusting the focus thereof for high resolution imaging of at least an axially extending narrow strip. Next, an engraving tool is operated to engrave a pattern of test cells in the printing surface. This pattern includes an isolated cell and a series of adjacent test cells sufficient in number to achieve steady state engraving. The isolated cell is sufficiently remote from any other cell to assure that it cannot appear in the same video image with any other engraved cell.

There is a subcell clock which controls the movement of the engraving tool, so that the system always knows the instantaneous angular position of a previously engraved cell, relative to the engraving tool. That relative position of the isolated cell is added to the estimated offset of the camera relative to the engraving tool to provide an estimated instantaneous angular position of the cell relative to the field of view of the camera. The camera is strobed to generate an image when the isolated cell is estimated to be at the center of the field of view. While this may not successfully image the isolated test cell, it does bring the cell sufficiently close to the camera for location by a vertical search.

If the cell does not immediately appear, the system adjusts a strobe control count which controls the phase of the video strobe and commences searching for the cell. A series of small phase adjustments are made, and a new video frame is triggered for each. The search continues until the cell is found. Then the strobe control count is adjusted to place the centroid of the cell at the center of the focussed strip.

After the image of the isolated cell has been centered within the focussed strip, the strobe control count is adjusted to account for the known offset between the isolated cell and another cell engraved under steady state conditions. This brings the other cell into the field of view of the camera. After that has been accomplished the strobe control count is adjusted for steady state operation by making a correction which will center the steady state cell within the focussed strip. The system then is ready to make accurate measurements of cell dimensions. The dimensions, so measured, may be used to compute engraving errors for closed loop adjustment of production engraving.

Measurement of a cell dimension is accomplished by processing a video image of the cell and generating a plurality of sets of runtables. Each set of runtables consists of run lengths for binary video information within a series of adjacent raster lines collectively defining a box. The boxes for the different sets of runtables cover different portions of the video image and may be partially or fully overlapping.

The system knows the approximate size of the cell dimension being measured and uses this knowledge to set limits for a maximum connected video run length. Measurement of a cell feature having the dimension of interest is accomplished by examining the runtable sets and finding a maximum connected video run length which falls between the established limits. That run length is used as a measure of the cell dimension.

DESCRIPTION OF THE PREFERRED EMBODIMENT

Figure 1:
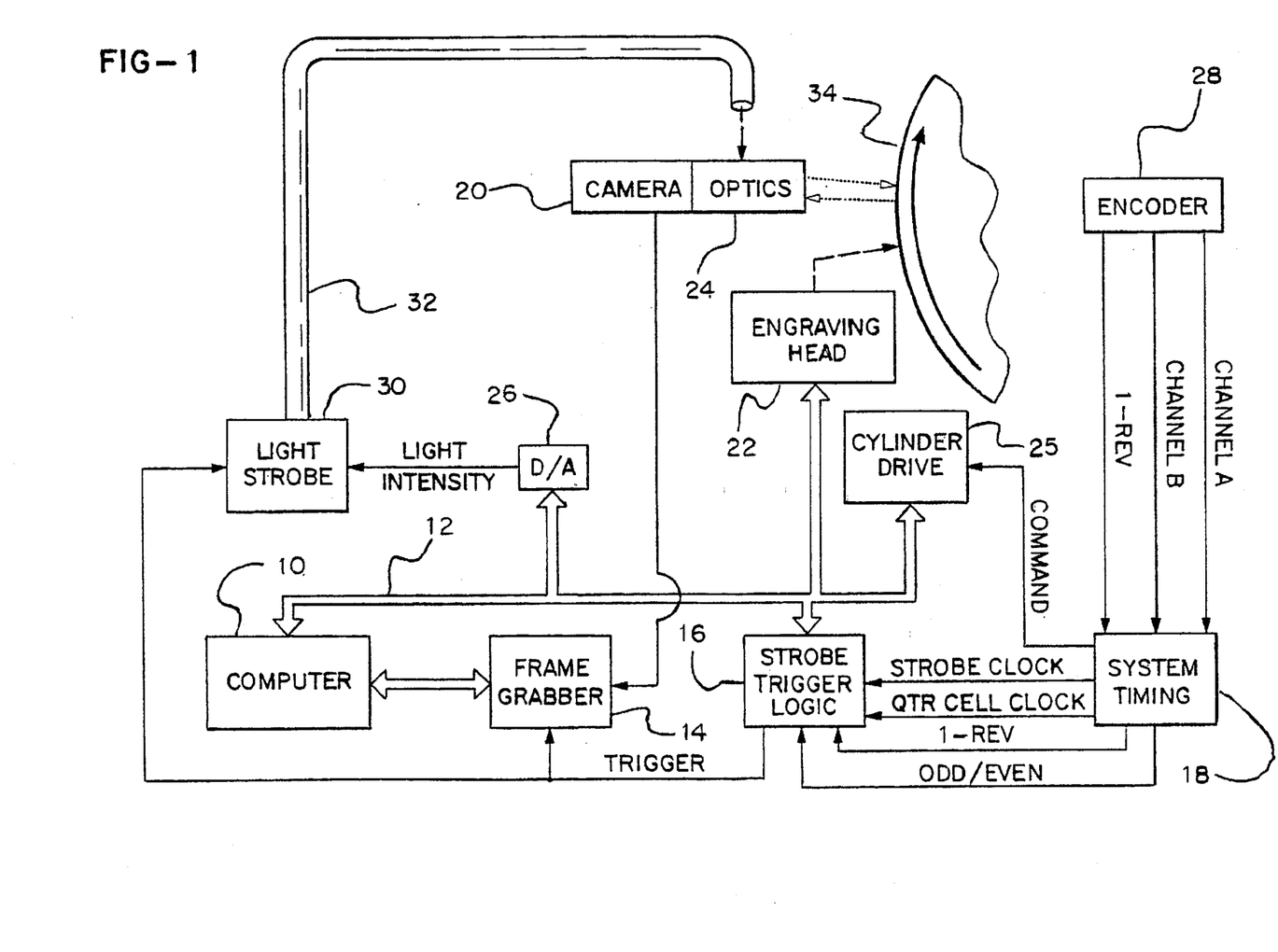
FIG. 1 is a block diagram of the engraving system of this invention.

Referring now to FIG. 1, there is illustrated a block diagram of a system according to the present invention. The system includes a computer 10 connected to a bus line 12 for communication with a frame grabber 14, a strobe trigger unit 16, a system timing unit 18, an engraving head 22, a cylinder drive unit 25 and a digital-to-analog converter 26. Engraving head 22 operates under control of computer 10 to engrave the surface of a gravure printing cylinder 34 which is axially rotated by the drive unit 25.

Drive unit 25 and engraving head 22 operate at a subcell clock frequency. Encoder 28 monitors the rotation of cylinder 34 and generates two channels of data which define the subcell clock. The subcell clock may be generated at any multiple of the cell engraving frequency. The implementation hereinafter described uses quarter cell clock pulses, four of which are generated for each cycle of engraving head motion. Encoder 28 transmits the subcell clock and a 1-REV signal to a timing unit 18. The 1-REV signal is an index signal which is pulsed once for each revolution of printing cylinder 34.

Timing unit 18 includes a frequency multiplier, which may take the form of a phase locked loop, connected for generating a strobe clock at an appropriate frequency. Preferably, the strobe clock is generated by multiplying a quarter cell clock by a factor of 40. Timing unit 18 sends the strobe clock, as well as the quarter cell clock, an ODD/EVEN revolution indication and the 1-REV signal to strobe trigger logic 16. These three signals are placed on bus 12 for transmission to computer 10 in the form of interrupts. Computer 10 then calculates a strobe control count, as hereinafter described, which is loaded into a strobe register 93 (FIG. 7) situated within the strobe trigger logic 16. Strobe register 93 generates trigger pulses to activate a light strobe 30, the intensity of which is controlled by D/A 26. Light strobe 30 directs a beam of light along a fiber optic cable 32 and into an optics unit 24. Trigger pulses from strobe register 93 are also supplied to frame grabber 14.

Optics unit 24 illuminates cells which are engraved into the surface of cylinder 34 by engraving head 22 and projects images of those cells onto a CCD array (not illustrated) in a video camera 20. Camera 20 creates rastered video frames which are selectively read by frame grabber 14 and stored in computer 10 in response to the trigger pulses from strobe register 93. Optics unit 24 may be focussed manually for high resolution imaging of the surface of cylinder 34. Preferably, however, camera 20 includes an auto focus unit (not illustrated) of the type described in copending application Ser. No. (Docket No. OEE 061 P2). Such an auto focus unit focusses the optics 24 upon surface scratches within a narrow strip extending axially along cylinder 34.

Figure 2:
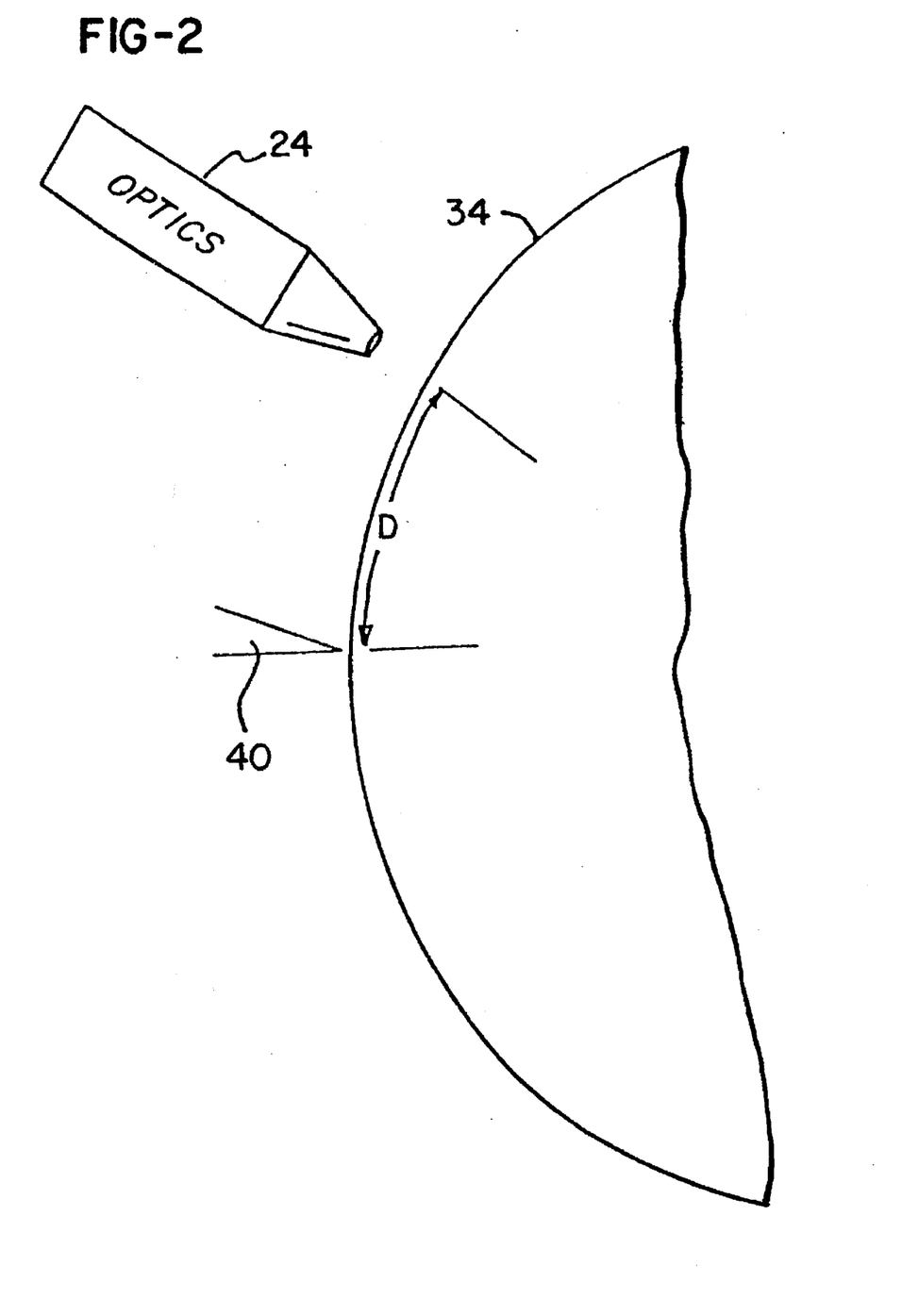
FIG. 2 is a schematic illustration of an offset between an engraving tool and a video camera.

FIG. 2 illustrates the spatial relationship between optics unit 24 and an engraving stylus 40 during scanning of cylinder 34 by camera 20 and optics 24. It can be seen that the optics produce an image of a location on the surface of cylinder 34 which is offset from the position of cutting tool 40 by a distance D. Because of this offset, camera 20 must wait a short period of time before imaging a newly engraved cell. This time delay, hereinafter termed a "transit time" may be calculated by dividing the distance D by the surface speed of cylinder 34. This is a one-time calculation which is held fixed by appropriate fixturing. The transit time calculation is converted to subcell counts and saved in memory.

As stated previously, engraving head 22 engraves the surface of cylinder 34 under control of computer 10. All engraving is synchronized by the 1-REV signal. Each cell is assigned a row location and is tagged with a subcell count which corresponds to the assigned row. The cell is engraved at a predetermined point in time established by counting subcell pulses which occur following a 1-REV signal. The subcell count associated with any given cell establishes the rotational phase of that cell relative to the index point on the printing cylinder. This phase count may be added to the above discussed transit time count to establish the point in time when an engraved cell is expected to pass through the field of view of video camera 20. With this information the system is able to activate light strobe 30 at the correct time for locating and imaging any predetermined cell. Positioning of the image within a video frame is refined by converting the subcell count to strobe control count, and adding a correction count, as will now be described.

Figure 3:
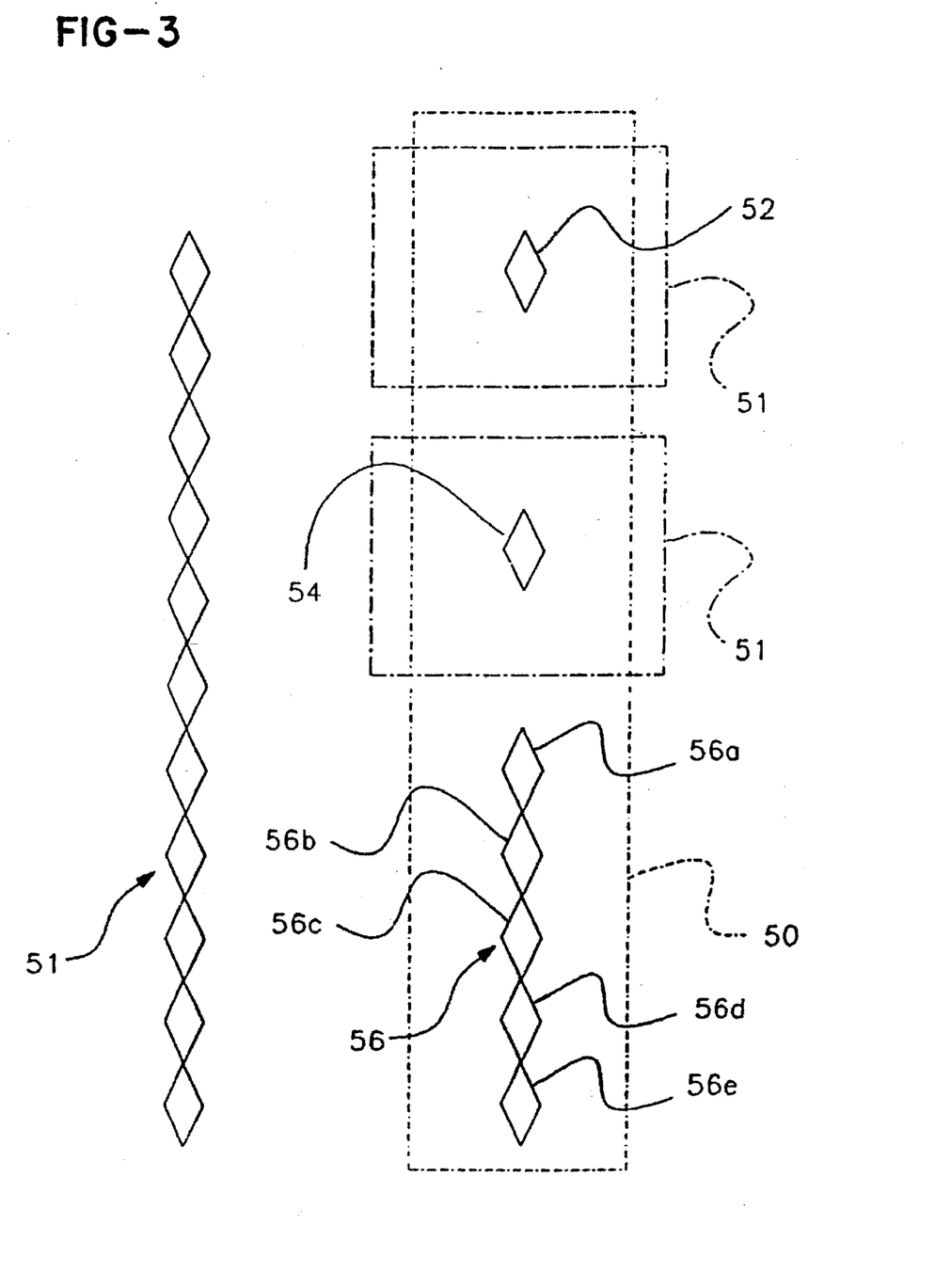
FIG. 3 is an illustration of an engraving test pattern.

Determination of a correction count commences by engraving a test block 50, as illustrated in FIG. 3. Test block 50 includes a first isolated test cell 52, a second isolated test cell 54 and a series of adjacent test cells 56. The series of test cells 56 includes cells 56a through 56e.

The engraving of isolated test cells 52, 54, and the first few cells of the series 56, is accompanied by transient motion of engraving stylus 40. However, the stylus has achieved a fairly steady state motion by the time it engraves cells 56d and 56e. Cells 52, 54 are sufficiently isolated to prevent any other cells, such as cells within the illustrated row 51 from appearing in the same video frame with either of cells 52 or 54.

After the test pattern 50 has been engraved, video camera 20 is strobed at a phase for placing isolated cell 52 approximately within the field of view of the camera. This approximate phase is determined in the manner described above. Then the cell is located and positioned as hereinafter described in detail with reference to FIGS. 9A and 9B.

Figure 4A:
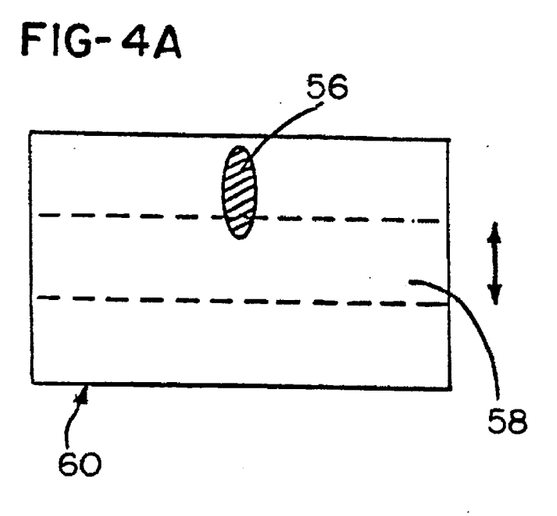
FIGS. 4A and 4B illustrate movement of a video image in response to a phase change in a video strobe.
Figure 4B:
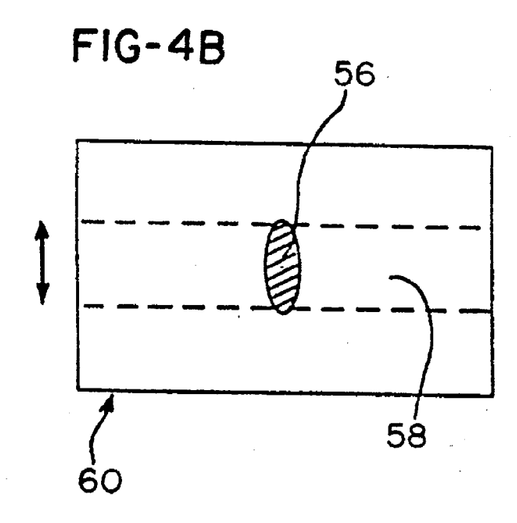

FIGS. 4A and 4B illustrate the final phases of a typical positioning adjustment. Shown therein is a video frame 60 including a strip 58 wherein the image information is well focussed. Appearing in video frame 60 is a representation 56 of isolated cell 52. In FIG. 4A the video representation 56 is slightly outside the region of focus 58. The positioning of the representation 56 indicates that there is too much delay. FIG. 4B illustrates a position of the representation 56 after the appropriate incremental delay has been subtracted.

After the strobing phase has been adjusted as illustrated in FIG. 4B, the system has an appropriate transit time correction to account for the offset of camera 20. However, the use of an isolated cell to make that correction introduces a small error due to transient operation of the engraving tool 40. This is illustrated in FIG. 5.

Figure 5:
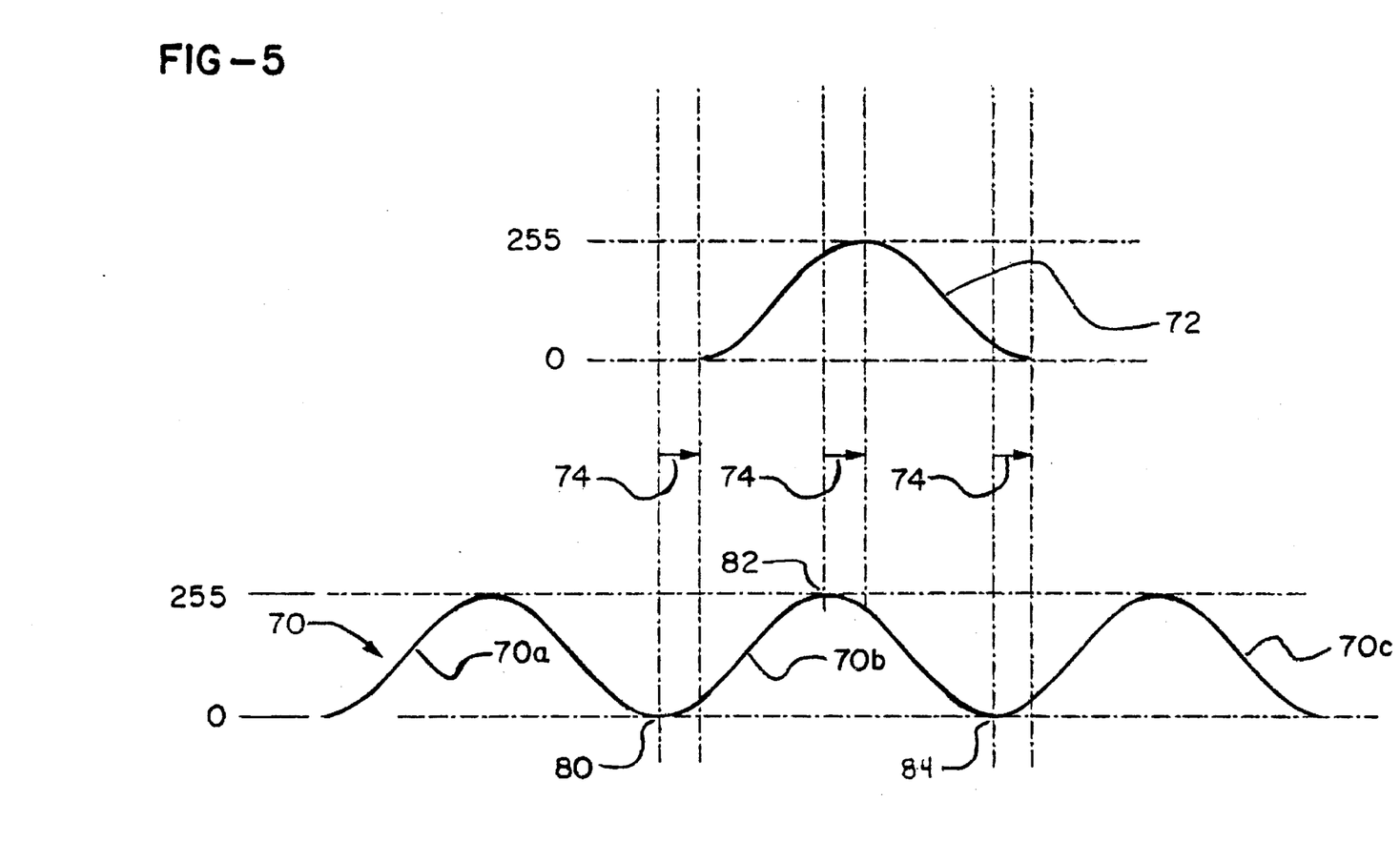
FIG. 5 illustrates transient and steady state motion of an engraving tool.
Figure 6:
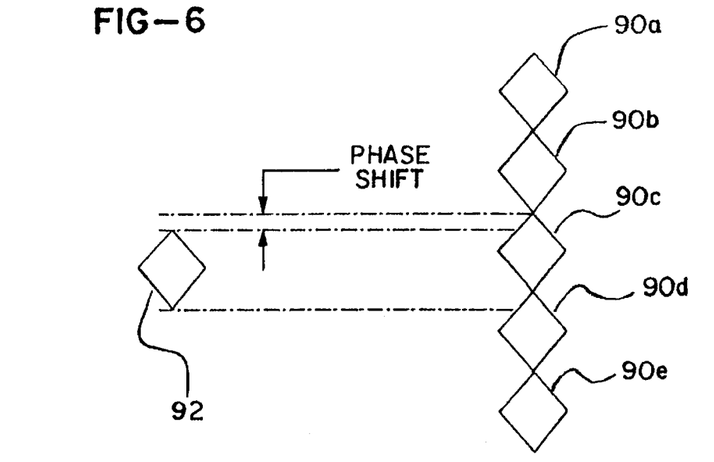
FIG. 6 illustrates the positioning of engraved cells resulting from engraving action as illustrated in FIG. 5.
Figure 7:
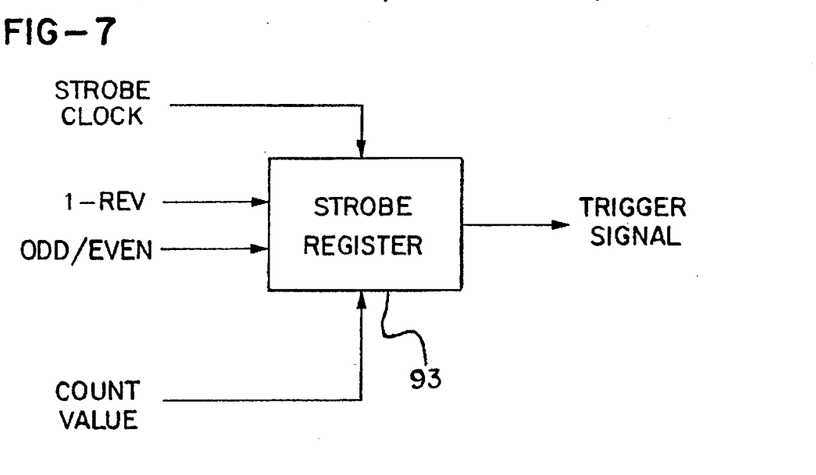
FIG. 7 illustrates a strobe register.
Figure 8:
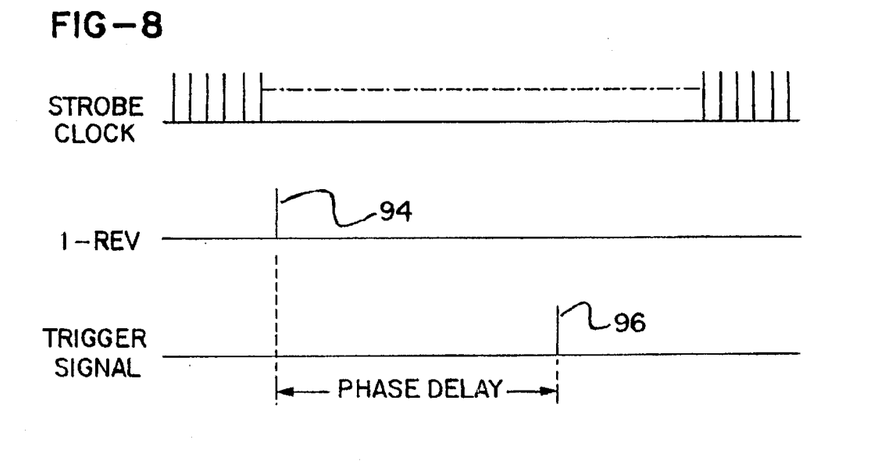
FIG. 8 is a timing diagram for video strobing.

Shown in FIG. 5 is a smooth sinusoidal line 70 which represents the movement of an engraving stylus during steady state engraving. This line oscillates between values of 0 and 255. Three wave lengths 70a, 70b and 70c are illustrated. Juxtaposed alongside line 70 is another line 72 illustrating the motion of engraving stylus 40 during engraving of an isolated cell. The line 72 crosses the 0 and 255 levels at times which are phase shifted relative to the corresponding points 80, 82, 84 of line 70. The amount of phase shift is indicated by the arrows 74, 74, 74. This phase shift produces an error which must be removed. FIG. 6 illustrates the corresponding positioning of an isolated cell 92 and three steady state cells 90b, 90c and 90d, all engraved by signals as illustrated in FIG. 5. Also shown on FIG. 6 are two additional steady state cells 90a and 90e FIG. 7 illustrates the input and output 10 lines for a strobe register 93. Strobe register 93 is clocked by the strobe clock, which as stated above, is 40 times faster than the quarter cell clock. A strobe control count is loaded into the register as appropriate for achieving the desired image positioning. A 1-REV trigger initiates a counting operation in register 93. During this counting operation register 93 counts strobe clock pulses until the strobe control count has been reduced to zero. At that point the register generates a trigger signal. A timing diagram illustrating a 1-REV pulse 94, a trigger pulse 96 and a strobe clock signal is presented in FIG. 8.

Figure 9A:
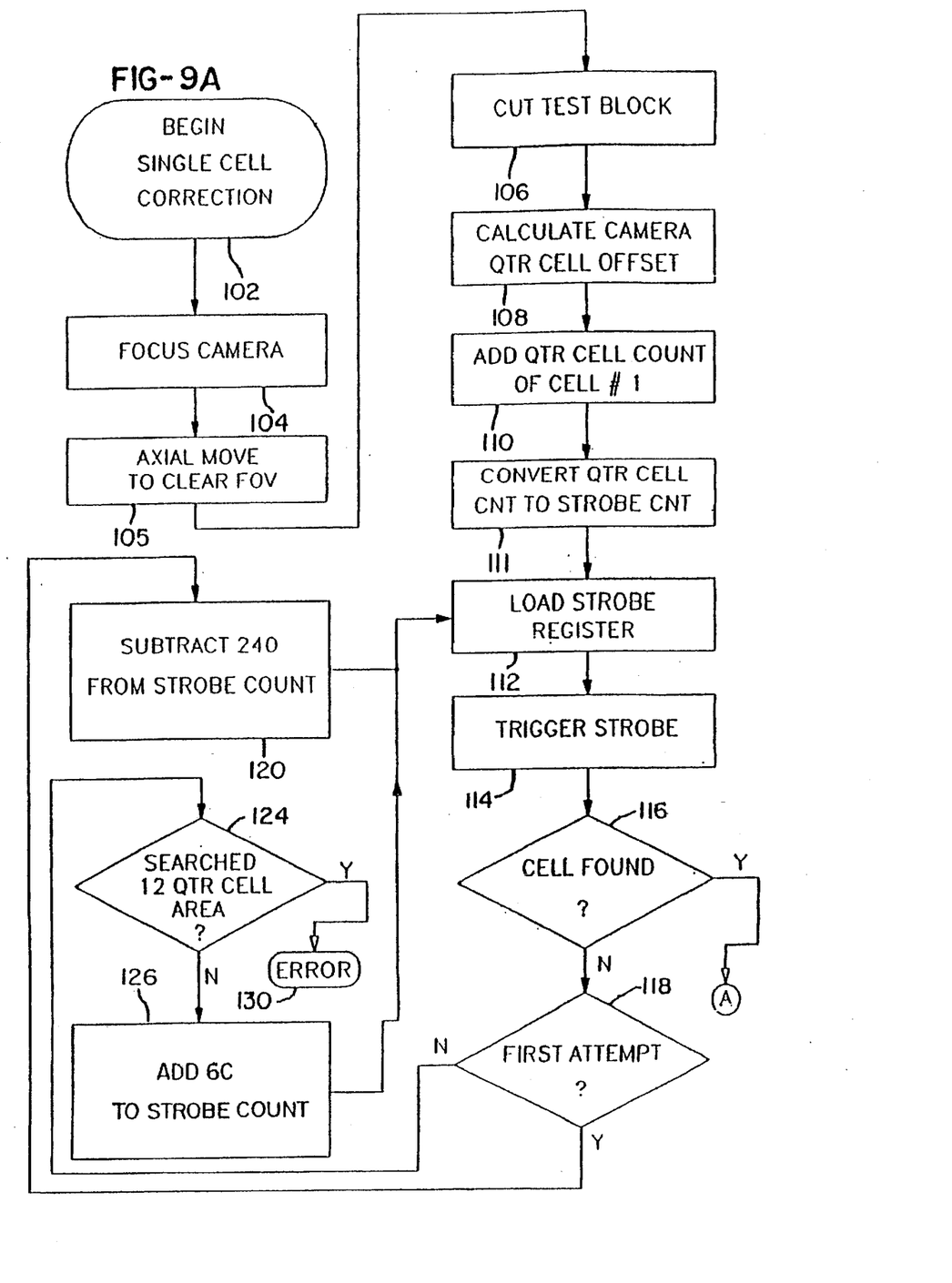
FIGS. 9A and 9B are a flow chart illustrating the method of this invention.
Figure 9B:
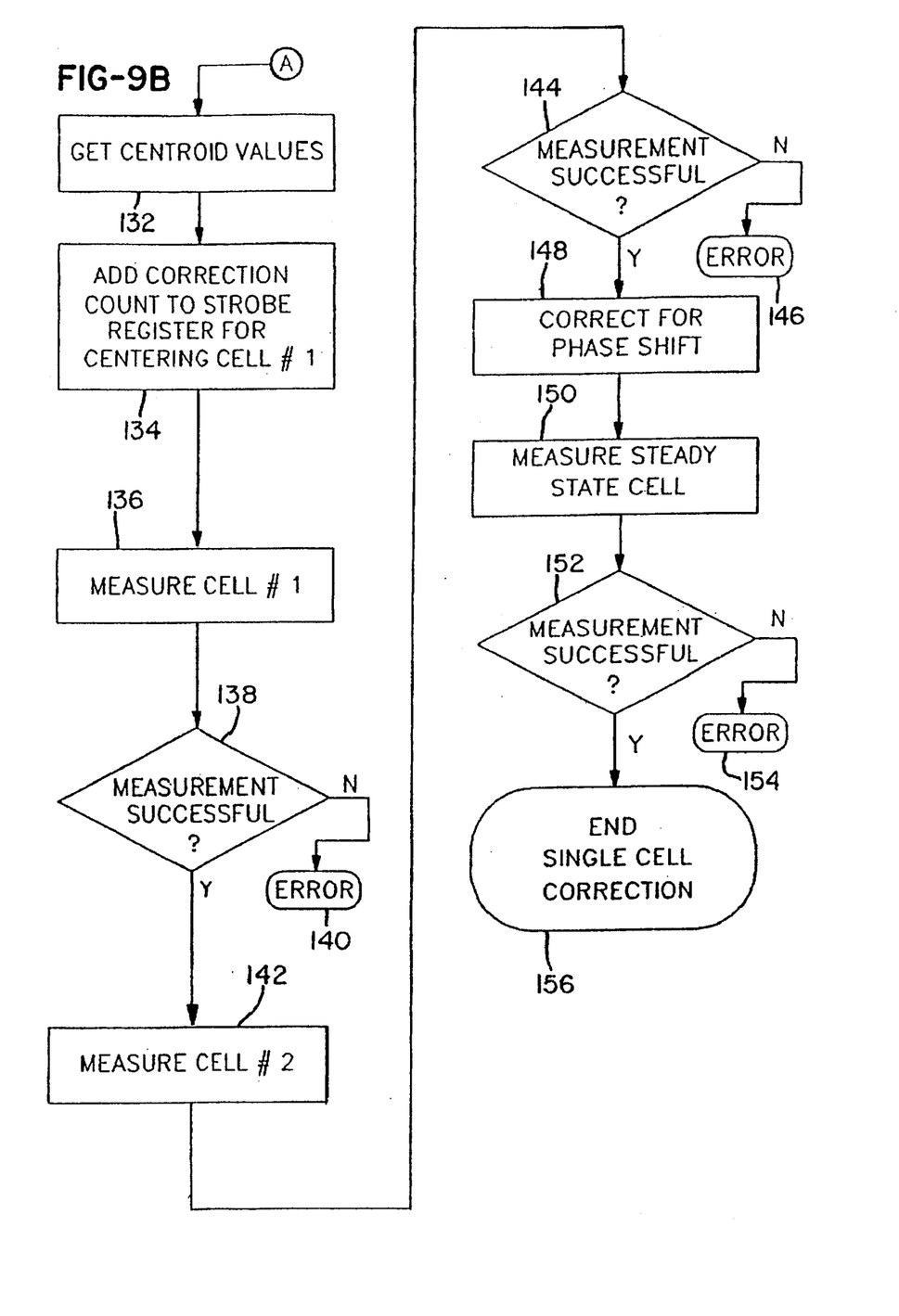

Referring now to FIGS. 9A and 9B, the method of this invention commences at entry point 102 and proceeds with camera focussing (block 104). Then, at block 105, the camera (also the optics and the engraving stylus) is moved in the axial direction (perpendicular to the plane of FIG. 1) an appropriate distance for moving the camera field of view away from any previously engraved cells, such as the cells 51 of FIG. 3. In this regard it will be appreciated that camera 20 and optics 24 are supported by a carriage which is driven in the axial direction by a lead screw. The same lead screw provides axial movement for engraving head 22. The lead screw and the carriage structure are conventional and are not illustrated in the drawing.

During production engraving the lead screw rotates in synchronism with the rotation of cylinder 34, so that camera 20, optics 24 and engraving head 22 progress axially along cylinder 34 in synchronism with cylinder rotation. This causes printing cells to be engraved along a helical track which progresses along the length of the cylinder. Alternatively, the lead screw may be driven in a stepped fashion to produce circumferential engraving, as is well known in the art.

In the practice of this invention it is necessary for the camera to dwell on an isolated cell and to observe the vertical movement of that cell within the camera field of view, as the phase of the strobe signal is adjusted. It is desired that the camera not move in the axial direction during such adjustment. It is further desirable that the camera and the engraving stylus remain at a fixed axial location after completion of the movement indicated by block 105. In the preferred embodiment the lead screw is motionless during the series of steps following block 105, but printing cylinder 34 continues to rotate.

After the camera 20 and optics 24 have been positioned the method proceeds to block 106 where engraving stylus 40 is activated to cut the test pattern 50 of FIG. 3. As discussed above, that test pattern includes an isolated cell 52 which is moved into a region of sharp focus 58, as illustrated in FIGS. 4A and 4B. This is a two step process. The first step involves a coarse strobe adjustment to place the cell somewhere within the field of view of camera 20. This enables cell location for performance of the second step, which is a fine adjustment of strobe timing.

After the test pattern 50 has been cut, the method proceeds to block 108 where the coarse strobe adjustment begins. At this point computer 10 calculates the subcell delay required for placing isolated cell #1 (cell 52 of FIG. 3) in the field of view of camera 20. In general the camera offset count will be known and need only be read from memory. The subcell count for the isolated cell will have been calculated by conventional methods in order to engrave the test pattern and is saved in memory. At block 110 the value of this count is be read from memory for addition to the camera offset count. The resulting count is multiplied by an appropriate factor to convert the quarter cell count to the corresponding strobe control count (block 111). In a typical case that factor may have a value of about 40. The strobe control count is saved for subsequent adjustment.

Block 112 begins a control loop concerned with locating isolated cell #1. Since the cell is isolated, any cell which is imaged in response to the above trigger strobe is known to be cell #1. At that point the stored value of the strobe control count is loaded into strobe register 93. The strobe register performs a down count and generates a trigger strobe (block 114).

The generation of a trigger strobe produces a video frame which is grabbed by frame grabber 14. This frame either does or does not contain an image of cell #1. At point 116 computer 10 checks the frame to determine whether a cell image is present. If so, then the program proceeds to block 132 of FIG. 9B.

If cell #1 is not immediately found then the program branches at point 118 to block 120 wherein the strobe control count is decreased by a number sufficient to produce 240 microns of movement. Then the program returns to block 112 and loads strobe register 93 with the decreased count value for triggering a repositioned video frame.

If cell #1 does not appear in the second frame, then the program branches to block 126, adds a 60 micron count to the strobe control value and triggers another video frame. The program continues looping through block 126 and looking for the cell until it is found or until there have been 9 passes through block 126. Upon exiting block 126 for the 9th time the program passes through branch point 124 to an error exit point 130. At this point the system will have scanned a vertical height of 480 microns, and this is taken as an indication that something has gone wrong.

After cell #1 has been found, the fine strobe adjustment step begins. Accordingly, the program proceeds to block #132 for locating the center of the cell. The cell center is located by a measurement technique as hereinafter described with reference to FIG. 10. Since the measurement is made before the cell is positioned within the finely focussed strip 58 of video frame 60, an accurate cell measurement cannot be made. However, the measurement is sufficiently accurate for determining the distance between the center of the cell and the center of the video frame. The vertical component of this distance is converted to an equivalent strobe count which is added to the stored strobe control count. The newly corrected value of the count is loaded into strobe register 93 at block 134, and a new video frame is triggered. This centers the cell in the video frame for an accurate measurement, which is performed at block 136.

As described below the measurement technique makes three measurement attempts within three different, preferably overlapping, measurement boxes. If measurement is unsuccessful, then the program passes through branch point 138 to an error exit 140.

If cell #1 is successfully measured, then the program branches to block 142 and measures isolated cell #2 (cell 54 of FIG. 3). This involves adjustment of the strobe control count to reflect a subcell positional separation between cell #1 and cell #2. This subcell difference is precisely known, and therefore strobe register 93 should trigger a video frame including an image of cell #2 which is vertically centered within the finely focussed strip 58. Cell #2 is measured at block 142 as a check upon the previous measurement of cell #1.

If cell #2 is not successfully measured, then the program passes through branch point 144 to an error exit at point 146.

If cell #2 is successfully measured, then the program proceeds to block 148 to commence a correction for the transient phase shift associated with engraving of an isolated cell. This involves measuring a cell such as cell 56d of FIG. 3 which is known to have been engraved under steady state conditions. The required correction for the strobe control count is determined by first adding the strobe count of the offset between cells 54 and 56d. Then strobe register 93 is activated to trigger a video frame containing an image of the steady state cell. This cell will appear with a vertical error as indicated in FIG. 6. The error is measured at block 150 and converted to an equivalent strobe count. That equivalent strobe count will be just the right size for removing the transient error from the strobe control count. Assuming that the steady state cell is successfully measured, the transient correction count is added to the strobe control count, and the process proceeds to a termination point 156. An unsuccessful effort to measure the steady state cell 56d causes the program to pass through branch point 52 and into an error exit 154.

It will be understood that the method of this invention may be used for locating and measuring any cell dimension of interest, provided that the relative position of a "centered" aiming point is known, and further provided that an approximate size for the dimension is known. This enables construction of a box encasing the dimension and centered within the region of sharpest focus. This is illustrated by a box 250 in FIG. 11.

Figure 11:
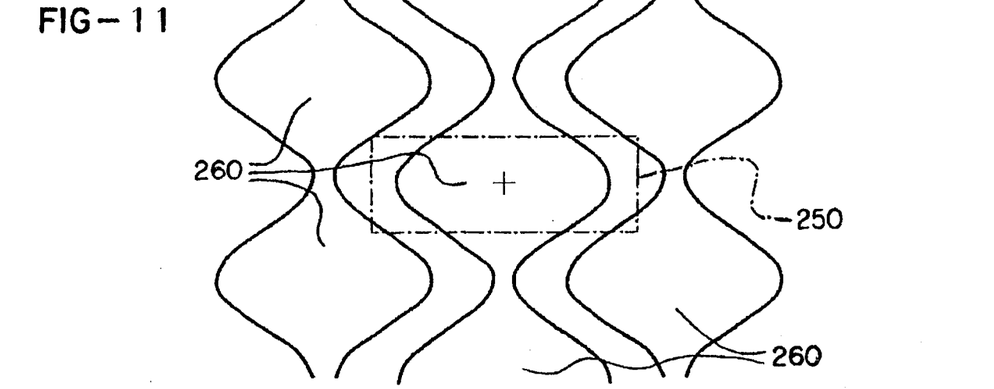
FIG. 11 illustrates box positioning within a field of cells.

As shown in FIG. 11, box 250 straddles the width of one several engraved cells 260. The measurement technique of this invention only considers information within a predefined portion of a video frame, such as, for instance box 250. This rejects noise and increases the probability of an accurate measurement.

Figure 10:
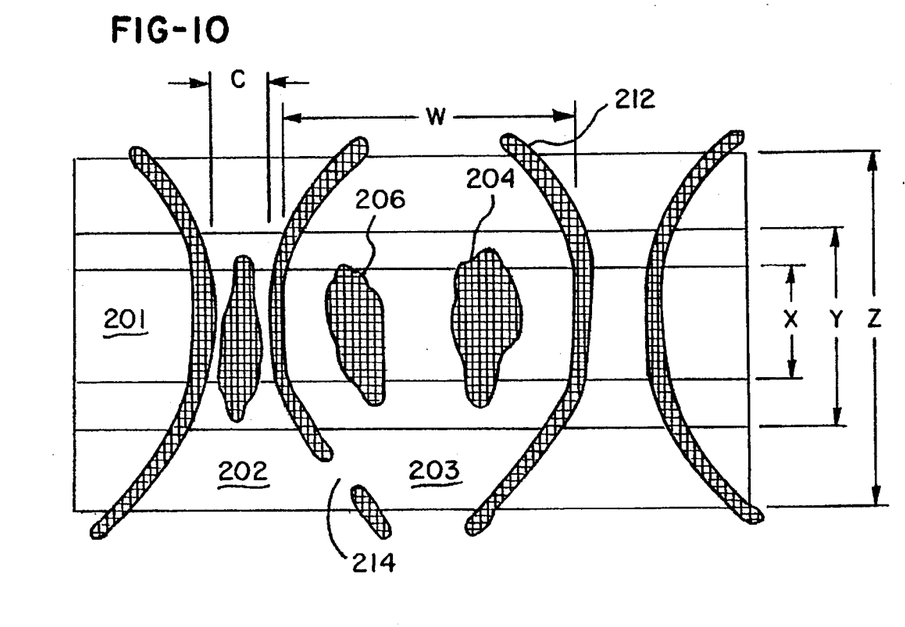
FIG. 10 illustrates a set of boxes for calculating connected video run lengths.

Referring now to FIG. 10, the cell measuring method of this invention will be explained. However, this requires a brief discussion of binary imaging. Binary images may be efficiently encoded in chord tables (sometimes called run-length encoding). The tables organize the chords by rows, and from left-to-right within each row. Each chord entry in a table consists of the starting column and ending column of the chord. An alternate representation uses vertical (column aligned) chords organized by columns and encodes the starting and ending rows of each chord. The encoded chords may represent either the white or dark pixels of the binary image; either representation is complete. An efficient algorithm for segmenting connected regions in chord-encoded binary images is well known. See "The Image Processing Handbook" by John C. Russ, CRC Press, 1992, especially pages 286–287 thereof. In this method, each chord is assigned a label which is unique to a segmented region.

For simplicity and clarity, the following discussion will assume horizontally-aligned (row-organized) chords encoding the white pixels. FIG. 10 schematically depicts a binary image of the type upon which measurements are to be made. The image might be derived from a micro-photograph of the engraved copper surface of a printing cylinder used in a roto-gravure printing machine. In the figure the thick curved lines 210,212 represent the walls of engraved printing cells and the desired measurements are the cell width, labeled 'W' in the figure, and the channel width, labeled 'C' in the figure. Two types of image defects that impede the desired measurements are blobs 204,206 called "islands" and cell wall breaks, such as break 214 in cell wall 210.

In an ideal image, i.e., without the islands and breaks, the chord-labeling procedure referenced above would easily segment the image into connected regions 201, 202 and 203 and measurement of the desired features could be easily performed by searching (in the chord table) each labeled region for a maximum region-width (for cell width measurements) or for a minimum region-width (for channel width measurements). As taught in the Russ reference, the maximum width of a connected region is determined by examining the chord tables for overlapping runs in adjacent scan lines and aggregating the minimum and maximum column numbers where overlap is observed.

The six horizontal lines pair-wise marked 'X', 'Y', and 'Z' in the above figure represent the top and bottom walls of three possible choices of boxes over which sets of chord-encoded representations (called "runtables") of the image scan lines therein might be formed for the purpose of measuring the features. In the absence of the islands 204,206 and wall break 214, the segmentation process would produce the same three connected regions for each choice of vertical extent for a runtable box, and three identical cell width and channel width measurements would be obtained.

With the islands and wall break present as indicated in FIG. 10, it may be seen that the region segmentation required to support valid measurements is obtained for only one of the three choices of vertical extent, specifically for the box defined by the two lines marked Y. If the vertical extent defined by the lines marked Z is used, the wall break 214 connects regions 202 and 203 into a single region, precluding successful measurement. For the vertical extent defined by the lines marked X, the islands cause region 202 to separate into two distinct connected regions, and they cause region 203 to break into three regions, again precluding valid measurements.

The measuring method of this invention determines the width of a cell feature by preparing sets of runtables for a plurality of overlapping boxes which collectively bracket the area of interest. Each of these sets of runtables is examined to determine a maximum connected run length The maximum connected run lengths, so determined, are compared against maximum and minimum expected values thereof. Any maximum connected run length which meets the established requirements may be used as the measured width. If no maximum connected run length meets the established run length limits, then a measurement failure is declared.

It will be appreciated that more or less than three measurement boxes may be selected and that features other than cell width and channel width may be measured, provided that the measurement boxes are maintained within the finely focussed strip running horizontally across the video frame. This frame generally occupies the middle third of the video frame and, in a typical case spans a region slightly larger than the region illustrated in FIG. 10.

It is contemplated that the method of this invention may be used for measuring the lengths of a series of adjacent strips across an engraved cell. These strip lengths may be totalled and multiplied by the strip width to provide a measure of the cell area. Such a cell area measurement may be made during production printing and used as an indication of cylinder wear. As gravure printing cylinders are used, the surface wear decreases the area of the engraved cells. As the wear continues, there comes a time when cylinder replacement becomes necessary. This invention provides a method for accomplishing that replacement on a timely basis.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of imaging an engraved area on a cylinder comprising the steps of:

imaging a portion of a surface of the cylinder with an imager; and registering said engraved area within a region of focus of said imager.

2. The method as recited in claim 1, further comprising the step of:

scanning image data generally corresponding to said portion.

3. The method as recited in claim 2 wherein said engraved area is at least one cell, said method further comprising the step of:

isolating said cell within said region of focus.

4. The method as recited in claim 3 wherein said engraved area is a scratch on said surface of said cylinder.

5. The method as recited in claim 2 wherein said engraved area is a cell.

6. The method as recited in claim 1, further comprising:

identifying said engraved area prior to said imaging step.

7. The method as recited in claim 6 wherein said engraved area is a cell.

8. The method as recited in claim 1 wherein said imager is associated with a stylus on said engraver, said method further comprising the step of:

determining an offset generally corresponding to a distance between said stylus and said imager.

9. The method as recited in claim 8 wherein said method is performed during real-time operation of the engraver.

10. The method as recited in claim 1 wherein said method is performed during real-time operation of the engraver.

11. The method as recited in claim 1, further comprising:

focusing said imager on said portion.

12. The method as recited in claim 1, further comprising:

measuring said engraved area.

13. The method as recited in claim 12 wherein said engraved area comprises at least one cell.

14. The method as recited in claim 1 wherein said engraved area comprises a plurality of cells.

15. The method as recited in claim 1, further comprising:

identifying a test cell;

strobing said portion with a strobe;

determining if said test cell falls within said region of focus.

16. The method as recited in claim 15, further comprising the step of:

determining a second offset if said test cell is not centered within said region of focus.

17. The method as recited in claim 16, further comprising the step of:

timing said strobe to adjust for said second offset.

18. The method as recited in claim 17, further comprising the step of:

performing said timing during real-time operation of the engraver.

19. The method as recited in claim 1, further comprising the step of:

timing said strobe to adjust for said second offset.

20. The method as recited in claim 19, further comprising the step of:

performing said timing during real-time operation of the engraver.

21. The method as recited in claim 20, further comprising the step of: measuring said engraved area.

22. The method as recited in claim 21, further comprising the step of:

automatically focusing on said engraved area.

23. A system for imaging an area on a surface of a cylinder, comprising:

an imager for imaging said area and for generating image data corresponding thereto; and a processor coupled to said imager for processing said data in order to cause at least a portion of said area to be registered within a region of focus of said imager.

24. The system as recited in claim 23, further comprising:

a scanner for scanning said image data.

25. The system as recited in claim 23 wherein said processor further comprises:

an isolator for isolating said at least a portion of said area from an non-isolated area of said at least a portion.

26. The system as recited in claim 25 wherein said at least a portion of said area is an engraved cell.

27. The system as recited in claim 25 wherein said at least a portion of said area is a scratch on a surface of said cylinder.

28. The system as recited in claim 23 wherein said processor further comprises a determiner for determining an offset generally corresponding to a distance between said stylus and said imager.

29. The system as recited in claim 23 wherein said system further comprises:

a strobe coupled to said processor for strobing said area to facilitate imaging said area.

30. The system as recited in claim 29 wherein said processor further comprises a timer for timing said imager to facilitate capturing an image of said area.

31. The system as recited in claim 23 wherein said processor further comprises a timer for timing said imager to facilitate capturing an image of said area.

32. The system as recited in claim 23 further comprising:

an auto focuser coupled to said processor for automatically focusing on said surface.

33. The system as recited in claim 23 wherein said processor comprises:

a measurer for receiving said image data and for generating a measurement of said at least a portion of said area.

34. The system as recited in claim 33 wherein said at least a portion is an engraved cell.

* * * * *

Disclaimer 5,671,063—Eric R. Auberry, Beavercreek; David L. Flannery, Englewood; Kenneth William Jackson, Dayton; David R. Seitz, Vandalia; Eric J. Serenius, Springboro, all of Ohio. ERROR TOLERANT METHOD AND SYSTEM FOR MEASURING FEATURES OF ENGRAVED AREAS. Patent dated Sept. 23, 1997. Disclaimer filed Oct. 10, 1997, by the assignee, Ohio Electric Engravers, Inc.

The term of this patent shall not extend beyond the expiration date of Pat. No. 5,438,422 of said patent.

*(Official Gazette, January 13, 1998)*